United States Patent
Xing (10) Patent No.: US 10,442,483 B2
(45) Date of Patent: Oct. 15, 2019

(54) BICYCLE ALARM DEVICE

(71) Applicant: Haoyu Xing, Shenzhen (CN)

(72) Inventor: Haoyu Xing, Shenzhen (CN)

( * ) Notice: Subject to any disclaimer, the term of this patent is extended or adjusted under 35 U.S.C. 154(b) by 0 days.

(21) Appl. No.: 16/067,129

(22) PCT Filed: Jan. 20, 2016

(86) PCT No.: PCT/CN2016/071456
§ 371 (c)(1),
(2) Date: Jun. 29, 2018

(87) PCT Pub. No.: WO2017/124325
PCT Pub. Date: Jul. 27, 2017

(65) Prior Publication Data
US 2019/0016401 A1    Jan. 17, 2019

(51) Int. Cl.
| B62H 5/20 | (2006.01) |
| B62H 5/00 | (2006.01) |
| G08B 21/24 | (2006.01) |
| B62J 3/00 | (2006.01) |

(52) U.S. Cl.
CPC ............... *B62H 5/20* (2013.01); *B62H 5/00* (2013.01); *B62J 3/00* (2013.01); *G08B 21/24* (2013.01)

(58) Field of Classification Search
CPC ..... B62J 3/00; B62H 5/00; B62H 5/20; G08B 21/24
See application file for complete search history.

(56) References Cited

U.S. PATENT DOCUMENTS 4,379,281 A * 4/1983 Thomas .............. B60R 25/1004
200/61.54
5,262,757 A * 11/1993 Hansen .................... G08B 3/10
340/328

(Continued)

FOREIGN PATENT DOCUMENTS

CN        2351354 Y      12/1999
CN       200949783 Y      9/2007

(Continued)

OTHER PUBLICATIONS https://web.archive.org/web/20130509180415/http:/personalalarms.com/acatalog/copy_of_Bike_Alarm.html, May 9, 2013.*

(Continued)

*Primary Examiner* — Andrew W Bee (57) ABSTRACT

The present disclosure provides a bicycle alarm device, including a main body and a connection mechanism connected with a bicycle. The main body comprises controller. The controller includes an upper cover and a lower cover connected with the upper cover. A first waterproof rubber ring is positioned between the upper cover and the lower cover. The main body also includes a battery compartment. One end of the battery compartment is connected with the controller, and the other end is connected with the connection mechanism. The battery compartment includes a compartment body and a compartment cover. A second waterproof rubber ring is positioned between the compartment body and the compartment cover. The present disclosure has good waterproof effect, and can effectively protect the controller and electrical parts in the battery compartment.

14 Claims, 7 Drawing Sheets

(56) References Cited

U.S. PATENT DOCUMENTS

| | | | | |
|---|---|---|---|---|
| 5,534,847 | A * | 7/1996 | McGregor | B62H 5/20 340/427 |
| 5,574,429 | A * | 11/1996 | Streeter | G08B 13/1436 340/529 |
| 6,443,473 | B1 * | 9/2002 | Lentz | B62J 99/00 280/288.4 |
| 7,070,295 | B1 * | 7/2006 | Lee | B62J 6/02 362/191 |
| 7,780,321 | B1 * | 8/2010 | Retief | B62J 6/16 362/474 |
| 8,493,194 | B1 * | 7/2013 | Shoolman | B62J 3/00 340/432 |
| 2006/0002119 | A1 * | 1/2006 | Sharp | B62J 6/003 362/473 |
| 2007/0109803 | A1 * | 5/2007 | Chuang | B62J 6/02 362/473 |
| 2010/0214793 | A1 * | 8/2010 | Retief | B62J 6/02 362/473 |
| 2011/0298601 | A1 * | 12/2011 | Foor | B62H 5/20 340/427 |
| 2012/0182748 | A1 * | 7/2012 | McCaslin | A42B 3/044 362/473 |
| 2013/0182423 | A1 * | 7/2013 | Matthews | A45F 5/02 362/191 |
| 2014/0300456 | A1 | 10/2014 | Parks | |
| 2016/0129960 | A1 * | 5/2016 | Akins | H04W 4/02 340/427 |
| 2016/0297490 | A1 * | 10/2016 | Containne | B62J 6/001 |

FOREIGN PATENT DOCUMENTS

| | | |
|---|---|---|
| CN | 101324978 A | 12/2008 |
| CN | 204587100 U | 8/2015 |
| CN | 105711691 A | 6/2016 |
| CN | 205524611 U | 8/2016 |

OTHER PUBLICATIONS

Guorong Chai, the International Searching Authority written comments, dated Oct. 2016, CN.

Guorong Chai, the International Search Report, dated Oct. 2016. CN.

* cited by examiner

BICYCLE ALARM DEVICE

TECHNICAL FIELD

The present disclosure relates to the field of alarm devices, and more particularly to a bicycle alarm device.

BACKGROUND

Bicycle is one of main vehicles frequently used by people in daily life. In recent years, there are more and more kinds of bicycles which become better in quality and higher in grade. But as a result, more and more bicycles and electric bicycles are lost. Although bicycle guards are disposed especially in some major places, such as front of doors of shopping malls and front of doors of schools, the bicycles are often stolen. Along with the fear and inconvenience caused by the theft of the bicycles, owners of the bicycles feel annoyed. Chinese patent CN101324978A, with the publication date of Dec. 17, 2008, discloses a burglar alarm for bicycle, including a signal transmitting device and a signal receiving device. The signal transmitting device comprises a power supply, an oscillator connected with the power supply, and a signal transmitter connected with the oscillator. The signal receiving device comprises a power supply, a signal receiver connected with the power supply, and a buzzer connected with the signal receiver. The alarm is divided into two portions, and is inconvenient in use.

SUMMARY

A technical problem to be solved by the present disclosure is to provide an integrated waterproof alarm device.

The purpose of the present disclosure is realized by the following technical solution: A bicycle alarm device comprises a main body and a connection mechanism connected with a bicycle. The main body comprises a controller. The controller comprises an upper cover and lower cover connected with the upper cover. A first waterproof rubber ring is positioned between the upper cover and the lower cover. The main body also comprises a battery compartment. One end of the battery compartment is connected with the controller, and the other end is connected with the connection mechanism. The battery compartment comprises a compartment body and a compartment cover. A second waterproof rubber ring is positioned between the compartment body and the compartment cover.

Further, the battery compartment is connected with a screw column and a wire passing hole convex groove protruded at one end of the controller. The lower cover is provided with a connecting protrusion portion. A wire passing hole matched with the wire passing hole convex groove and a screw seat matched with the screw column are disposed in the connecting protrusion portion. The wire passing hole comprises an accommodating hole wall for accommodating the wire passing hole convex groove. The screw seat comprises an accommodating column for accommodating a column body of the screw column.

The protruded screw column and wire passing hole convex groove can prevent outside water from entering the battery compartment from the joint of the battery compartment to enhance a waterproof effect of the battery compartment. The wire passing hole matched with the wire passing hole convex groove and the screw seat matched with the screw column respectively have accommodating hole walls for accommodating the wire passing hole convex groove. The screw seat comprises an accommodating column for accommodating the column body of the screw column. Mutual transition portions are overlapped to enhance the waterproof effect of the joint.

Further, a connection groove is formed at one end of the battery compartment connected with the controller. The screw column and the wire passing hole convex groove are disposed at the bottom of the connection groove. The connecting protrusion portion covers the connection groove. The wire passing hole and the screw seat are disposed in the connecting protrusion portion.

The screw column and the wire passing hole convex groove are disposed at the bottom of the connection groove, and can be made to be longer on the basis of not lengthening the distance between the battery compartment and the controller, thereby enhancing the waterproof effect.

Further, one end of the battery compartment connected with the controller is a curve portion with a curve shape. The connection groove is disposed in the curve portion. The bottom of the connecting protrusion portion is matched with the curve portion to form a connection curve portion.

One end of the battery compartment connected with the controller is a curve and can enable the water flowing to the upper portion of the battery compartment to shunt quickly to prevent the water from being retained on the battery compartment.

Further, an inner side of the upper cover is provided with an upper cover groove. The bottom of the upper cover groove is provided with a button hole. The controller also comprises a button rubber cover. The button rubber cover is embedded into the groove and covers the edge of the groove.

The button rubber cover enhances the waterproof effect of the button.

Further, the lower cover is provided with a loudspeaker placing ring for placing a loudspeaker. A sounding hole is disposed in the loudspeaker placing ring. An outer side of the sounding hole is provided with a loudspeaker cover.

The sound effect of the loudspeaker is enhanced.

Further, the outer edge of the loudspeaker placing ring is protruded from the outer side of the lower cover to form a loudspeaker convex loop. The outer edge of the sounding hole is protruded from the outer side of the lower cover to form a sounding hole bulge. The sounding hole bulge is disposed in the loudspeaker convex loop. The loudspeaker cover covers the sounding hole bulge. The loudspeaker cover is larger than the sounding hole bulge and smaller than the loudspeaker convex loop.

The loudspeaker cover protects the inside loudspeaker and can be used for amplifying the sound to achieve the action of a sound cavity.

Further, the inner side of the loudspeaker cover is provided with at least two bottom supporting ribs. The bottom supporting ribs and the sounding hole bulge are hot melted and fixed through ultrasonic waves.

Installation is convenient.

Further, the ends of the bottom supporting ribs are provided with positioning bulges.

The loudspeaker cover is accurate in positioning, convenient and rapid and adopts fool-proofing design.

Further, the connection mechanism comprises a fixed ring and a connection portion. The fixed ring is provided with a separating port. Both ends of the separating port of the fixed ring are respectively connected with a connection portion. The connection portion is provided with a screw through hole. The battery compartment is provided with a protrusion portion. The protrusion portion is provided with a screw through hole. The connection mechanism also comprises a screw and a nut. The nut is disposed in the screw through hole. The screw goes through the screw through hole of the protrusion portion and the screw through holes of two connection portions to match with the nut. The protrusion portion is also provided with a screw cover. The protrusion portion is provided with a clip through hole. The screw cover comprises a first protrusion portion and a second protrusion portion. The first protrusion portion is clamped with the clip through hole.

The bicycle alarm device is convenient to install on the bicycle and is adjustable in position.

The present disclosure comprises the main body and the connection mechanism connected with the bicycle. The main body comprises the controller and the battery compartment. The whole bicycle alarm device is an integrated device and is convenient and portable in use. Moreover, the first waterproof rubber ring is positioned between the upper cover and the lower cover of the controller. The second waterproof rubber ring is positioned between the compartment body and the compartment cover of the battery compartment. The present disclosure has good waterproof effect, and can effectively protect the controller and electrical parts in the battery compartment.

In the figures: 1 bicycle alarm device; 2 main body; 3 connection mechanism; 31 fixed ring; 32 connection portion; 33 separating port; 35 nut; 4 controller; 41 upper cover; 411 upper cover groove; 412 button hole; 413 button rubber cover; 414 transparent piece; 42 lower cover; 420 connecting protrusion portion; 421 wire passing hole; 422 screw seat; 423 loudspeaker placing ring; 424 sounding hole; 425 loudspeaker convex loop; 426 sounding hole bulge; 427 loudspeaker cover; 428 bottom supporting rib; 429 positioning bulge; 43 first waterproof rubber ring; 5 battery compartment; 51 compartment body; 511 separating sheet; 52 compartment cover; 53 second waterproof rubber ring; 54 screw column; 55 wire passing hole convex groove; 56 curve portion; 57 connection groove; 58 nonskid groove; 59 series portion; 591 screw cover; 592 clip through hole; 593 first protrusion portion; 594 second protrusion portion; 595 embedding column; and 6 circuit board.

DETAILED DESCRIPTION

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as, a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present disclosure, the meaning of "a plurality of" is two or more unless otherwise specified. In addition, the term "comprise" and any variant are intended to cover non-exclusive inclusion.

It should be noted in the description of the present disclosure that, unless otherwise specifically regulated and defined, terms such as "installation," "connected," and "connecting" shall be understood in broad sense, and for example, may refer to fixed connection or detachable connection or integral connection, may refer to mechanical connection or electrical connection, and may refer to direct connection or indirect connection through an intermediate medium or inner communication of two elements. For those ordinary skilled in the art, the meanings of the above terms in the present disclosure may be understood according to concrete conditions.

The present disclosure will be further described in detail below in combination with the drawings and preferred embodiments.

As shown in FIG. 1 to FIG. 9, a bicycle alarm device 1 comprises a main body 2 and a connection mechanism 3 connected with a bicycle. The main body 2 comprises a controller 4. The controller 4 comprises an upper cover 41 and a lower cover 42 connected with the upper cover 41. A first waterproof rubber ring 43 is positioned between the upper cover 41 and the lower cover 42. The Main body 2 also comprises a battery compartment 5. One end of the battery compartment 5 is connected with the controller 4, and the other end is connected with the connection mechanism 3. The battery compartment 5 comprises a compartment body 51 and a compartment cover 52. A second waterproof rubber ring 53 is positioned between the compartment body 51 and the compartment cover 52.

Figure 1:
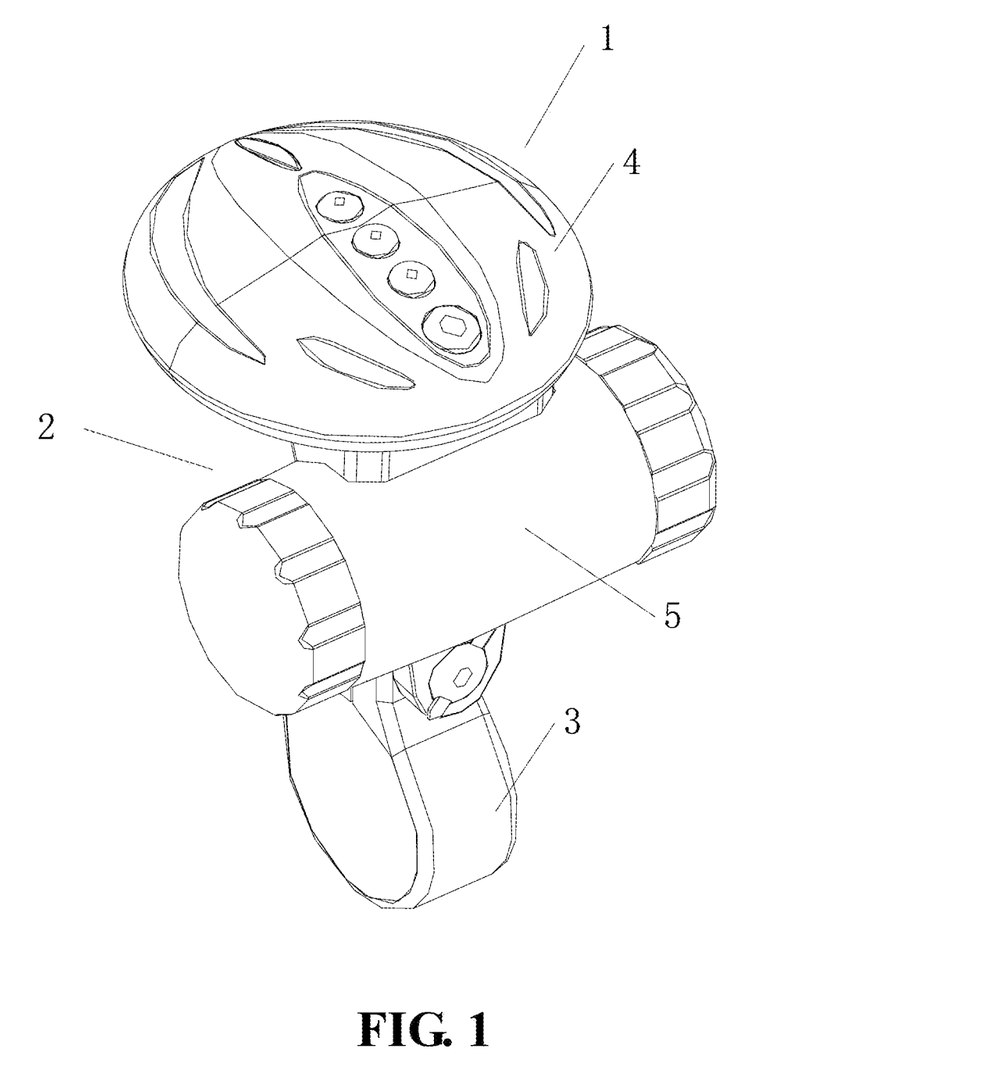
FIG. 1 is a schematic diagram of a bicycle alarm device in embodiments of the present disclosure.
Figure 2:
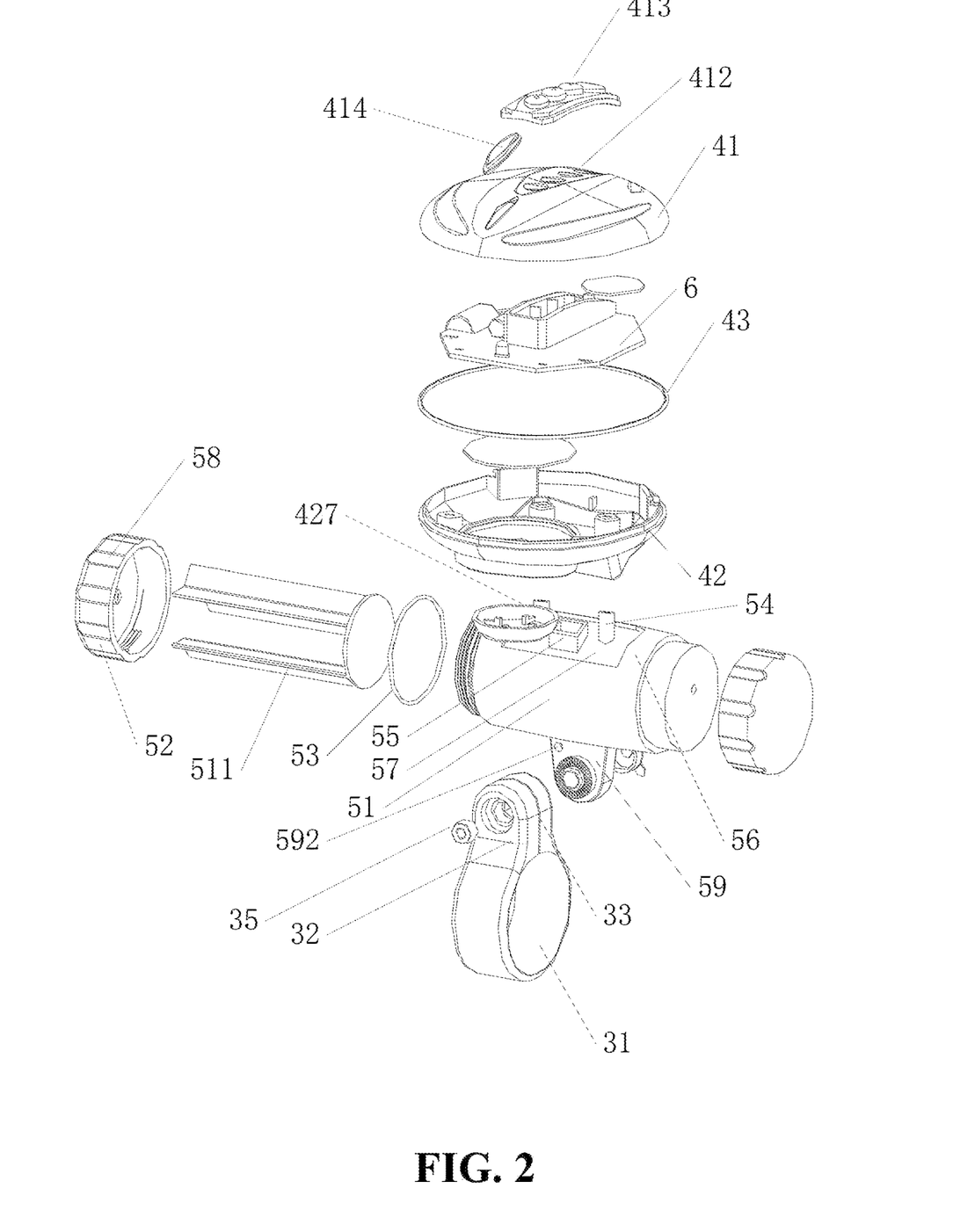
FIG. 2 is an exploded schematic diagram of a bicycle alarm device in embodiments of the present disclosure.

The present embodiment comprises the main body 2 and the connection mechanism 3 connected with the bicycle. The main body 2 comprises the controller 4 and the battery compartment 5. The whole bicycle alarm device 1 is an integrated device and is convenient and portable in use. Moreover, the first waterproof rubber ring 43 is positioned between the upper cover 41 and the lower cover 42 of the controller 4. The second waterproof rubber ring 53 is positioned between the compartment body 51 and the compartment cover 52 of the battery compartment 5. The present embodiment has good waterproof effect, and can effectively protect the controller 4 and electrical parts in the battery compartment 5.

Figure 3:
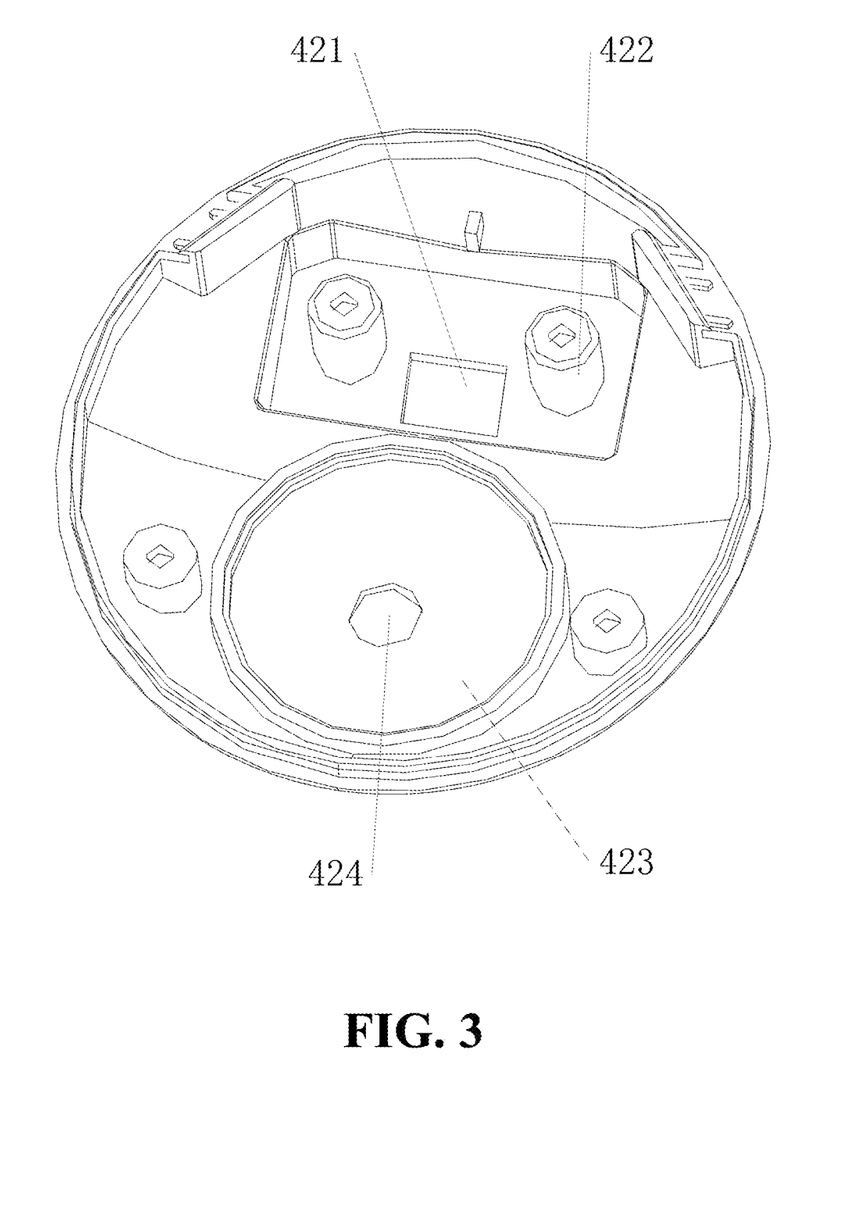
FIG. 3 is a schematic diagram of an inner side of a lower cover in embodiments of the present disclosure.
Figure 7:
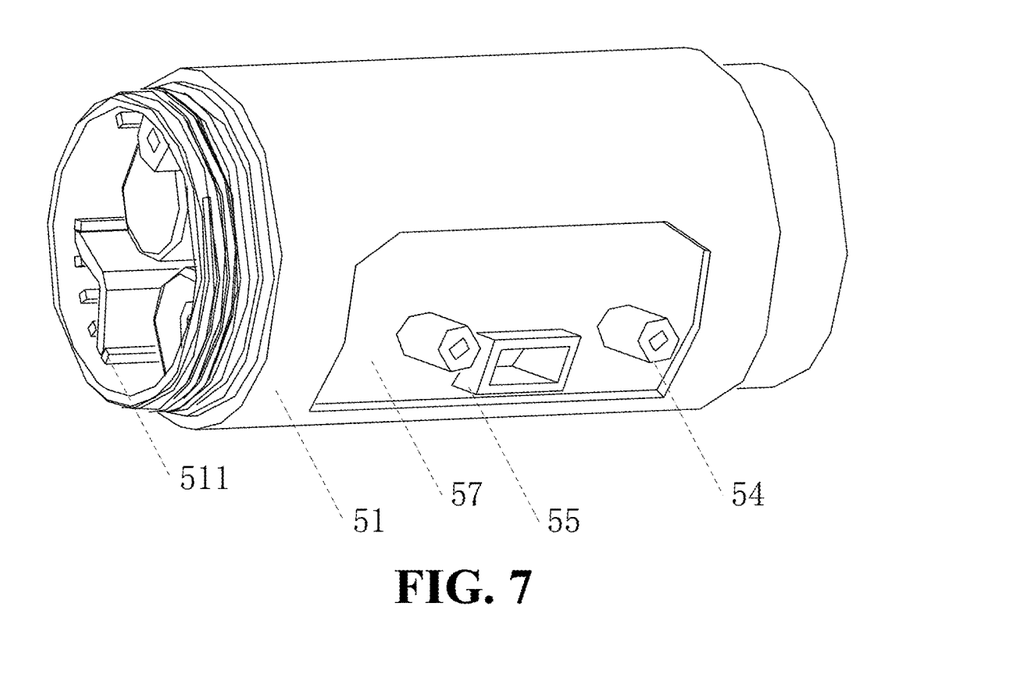
FIG. 7 is a schematic diagram of a battery compartment in embodiments of the present disclosure.

The battery compartment 5 is connected with a screw column 54 and a wire passing hole convex groove 55 protruded at one end of the controller 4. The lower cover 42 is provided with a connecting protrusion portion 420. A wire passing hole 421 matched with the wire passing hole convex groove 55 and a screw seat 422 matched with the screw column 54 are disposed in the connecting protrusion portion 420. The wire passing hole 421 comprises an accommodating hole wall for accommodating the wire passing hole convex groove 55. The screw seat 422 comprises an accommodating column for accommodating a column body of the screw column 54. The protruded screw column 54 and wire passing hole convex groove 55 can prevent outside water from entering the battery compartment 5 from the joint of the battery compartment 5 to enhance a waterproof effect of the battery compartment 5. The wire passing hole 421 matched with the wire passing hole convex groove 55 and the screw seat 422 matched with the screw column 54 respectively have accommodating hole walls for accommodating the wire passing hole convex groove 55. The screw seat 422 comprises an accommodating column for accommodating the column body of the screw column 54. Mutual transition portions are overlapped to enhance the waterproof effect of the joint.

A connection groove 57 is formed at one end of the battery compartment 5 connected with the controller 4. The screw column 54 and the wire passing hole convex groove 55 are disposed at the bottom of the connection groove 57. The connecting protrusion portion 420 covers the connection groove 57. The wire passing hole 421 and the screw seat 422 are disposed in the connecting protrusion portion 420. The screw column 54 and the wire passing hole convex groove 55 are disposed at the bottom of the connection groove 57, and can be made to be longer on the basis of not lengthening the distance between the battery compartment 5 and the controller 4, thereby enhancing the waterproof effect.

One end of the battery compartment 5 connected with the controller 4 is a curve portion 56 with a curve shape. The connection groove 57 is disposed in the curve portion 56. The bottom of the connecting protrusion portion 420 is matched with the curve portion 56 to form a connection curve portion 56. One end of the battery compartment 5 connected with the controller 4 is a curve and can enable the water flowing to the upper portion of the battery compartment 5 to shunt quickly to prevent the water from being retained on the battery compartment 5. The battery compartment 5 can also be cylindrical on the whole. A plurality of batteries are disposed in the battery compartment 5. Battery separating sheets 511 are disposed among the plurality of batteries. The batteries in the battery compartment 5 can also be replaced with rechargeable lithium batteries, etc.

A plurality of nonskid grooves 58 are formed at the outer side of the side edge of the compartment cover 52 of the battery compartment 5. The compartment body 51 and the compartment cover 52 are connected through threads.

Figure 5:
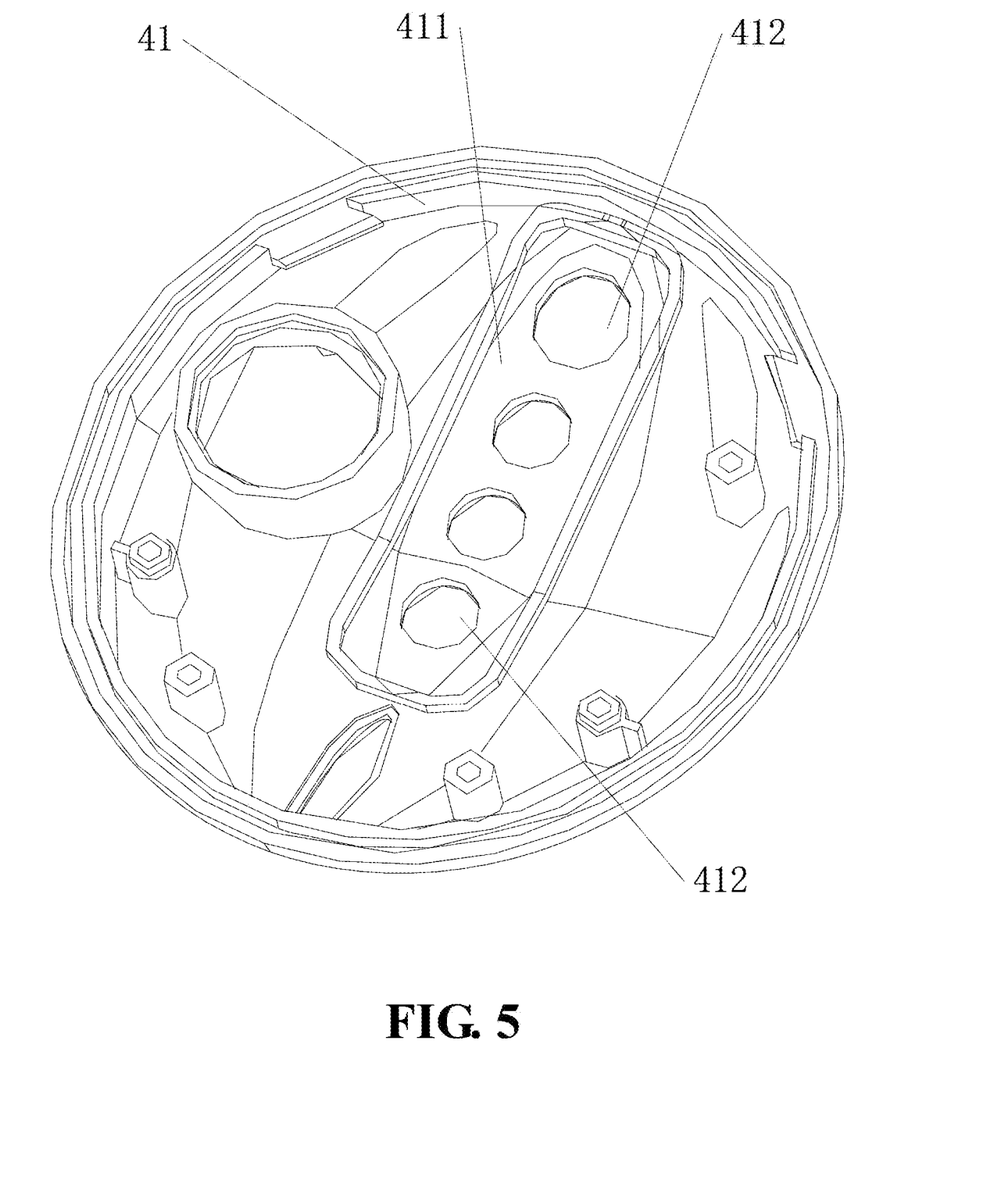
FIG. 5 is a schematic diagram of an inner side of an upper cover in embodiments of the present disclosure.

An inner side of the upper cover 41 is provided with an upper cover groove 411. The bottom of the upper cover groove 411 is provided with a button hole 412. The controller 4 also comprises a button rubber cover 413. The button rubber cover 413 is embedded into the groove and covers the edge of the groove. The button rubber cover 413 enhances the waterproof effect of the button. Button convex points are disposed corresponding to the function buttons in the button rubber cover 413.

Figure 4:
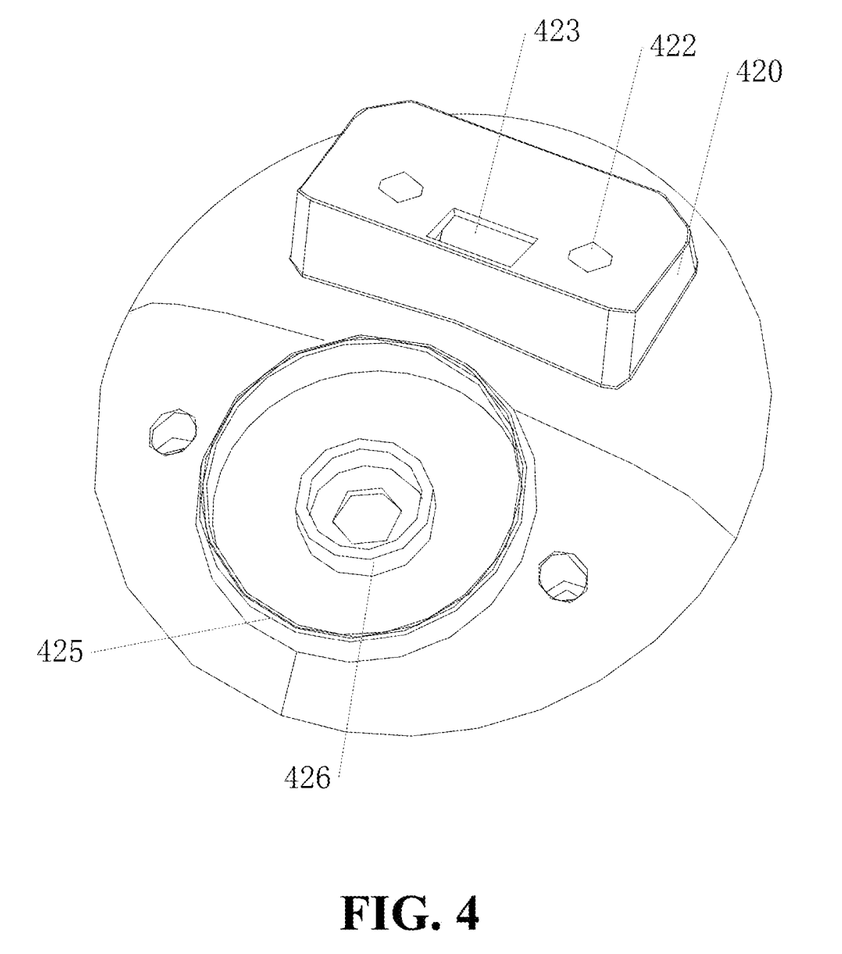
FIG. 4 is a schematic diagram of an outer side of a lower cover in embodiments of the present disclosure.

The lower cover 42 is provided with a loudspeaker placing ring 423 for placing a loudspeaker. A sounding hole 424 is disposed in the loudspeaker placing ring 423. An outer side of the sounding hole 424 is provided with a loudspeaker cover 427. The outer edge of the loudspeaker placing ring 423 is protruded from the outer side of the lower cover 42 to form a loudspeaker convex loop 425. The outer edge of the sounding hole 424 is protruded from the outer side of the lower cover 42 to form a sounding hole bulge 426. The sounding hole bulge 426 is disposed in the loudspeaker convex loop 425. The loudspeaker cover 427 covers the sounding hole bulge 426. The loudspeaker cover 427 is larger than the sounding hole bulge 426 and smaller than the loudspeaker convex loop 425.

The sound effect of the loudspeaker is enhanced. The loudspeaker cover 427 protects the inside loudspeaker and can be used for amplifying the sound to achieve the action of a sound cavity.

Figure 6:
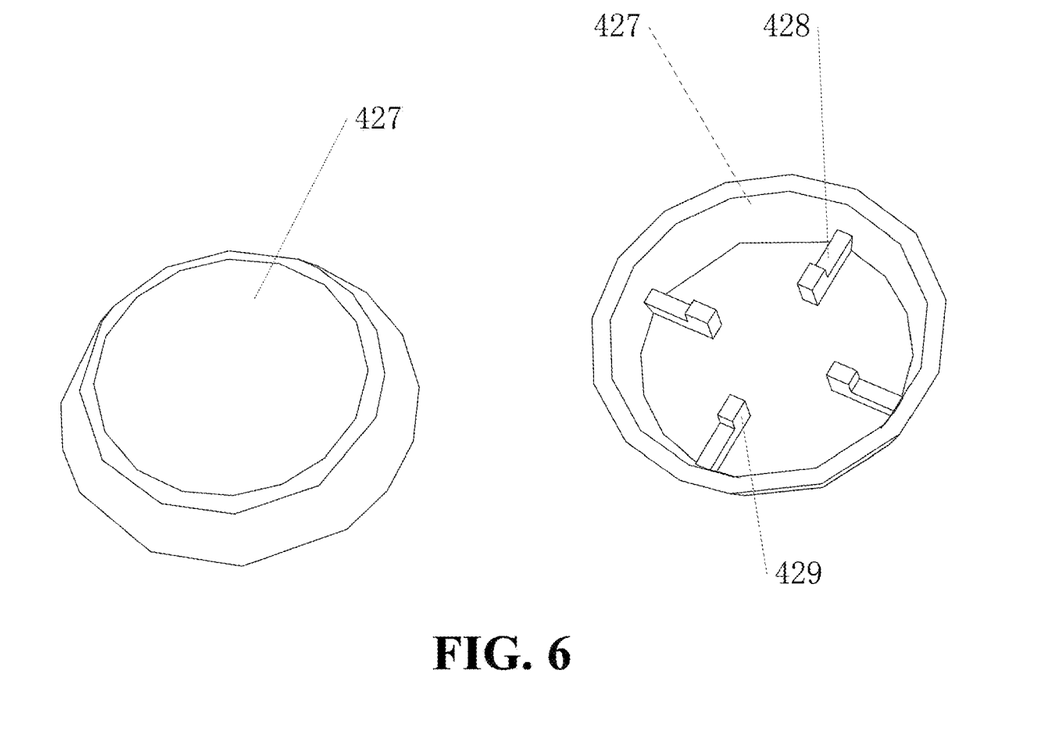
FIG. 6 is a schematic diagram of an inner side and an outer side of a loudspeaker cover in embodiments of the present disclosure.

The inner side of the loudspeaker cover 427 is provided with at least two bottom supporting ribs 428. The bottom supporting ribs 428 and the sounding hole bulge 426 are hot melted and fixed through ultrasonic waves. The ends of the bottom supporting ribs 428 are provided with positioning bulges 429.

Installation is convenient due to hot melt and fixation through the ultrasonic waves. The loudspeaker cover 427 is accurate in positioning, convenient and rapid and adopts fool-proofing design.

Figure 8:
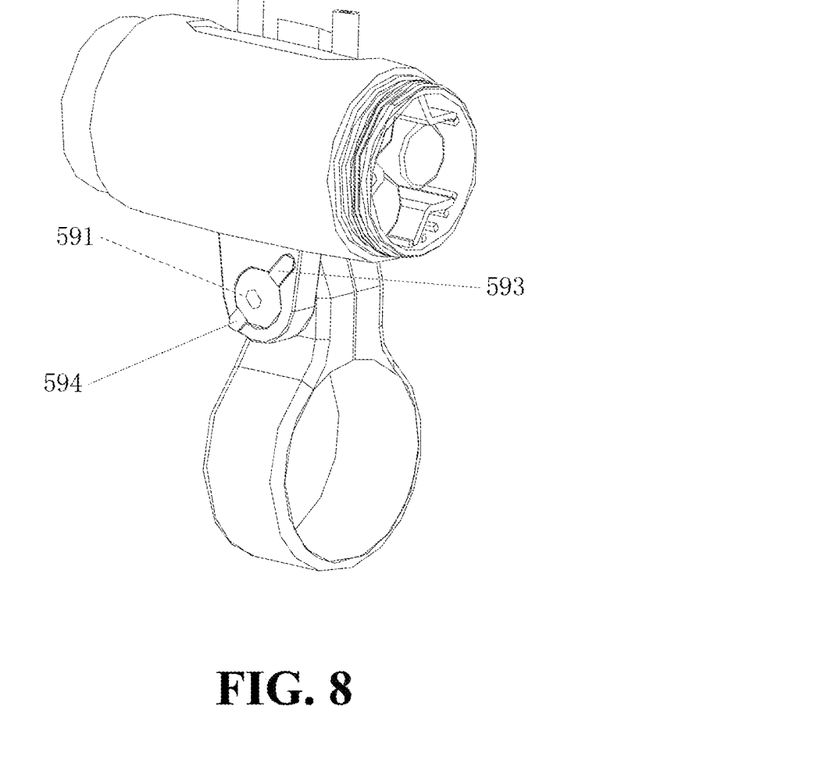
FIG. 8 is a schematic diagram of a connection mechanism of a bicycle alarm device in embodiments of the present disclosure.
Figure 9:
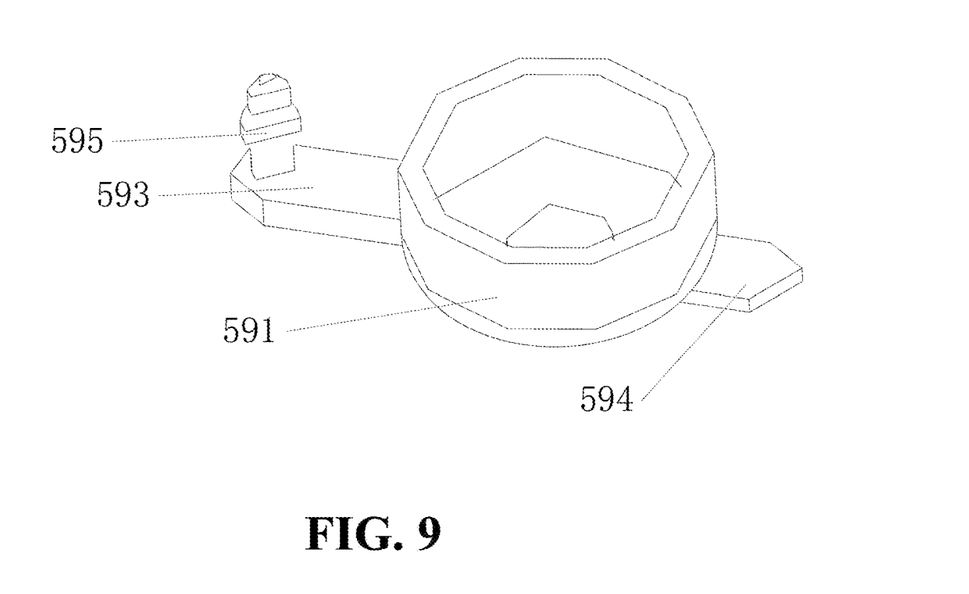
FIG. 9 is a schematic diagram of screw cover in embodiments of the present disclosure.

The connection mechanism 3 comprises a fixed ring 31 and a connection portion 32. The fixed ring 31 is provided with a separating port 34. Both ends of the separating port 34 of the fixed ring 31 are respectively connected with a connection portion 32. The connection portion 32 is provided with a screw through hole. The battery compartment 5 is provided with a series portion 59. The series portion 59 is provided with a screw through hole. The connection mechanism 3 also comprises a screw and a nut 35. The nut 35 is disposed in the screw through hole. The screw goes through the screw through hole of the series portion 59 and the screw through holes of two connection portions 32 to match with the nut 35. The series portion 59 is also provided with a screw cover 591. The series portion 59 is provided with a clip through hole 592. The screw cover 591 comprises a first protrusion portion 593 and a second protrusion portion 594. The first protrusion portion 593 is clamped with the clip through hole 592. The bicycle alarm device is convenient to install on the bicycle and is adjustable in position. The first protrusion portion 593 comprises an embedding column 595 embedded into the clip through hole 592. The embedding column 595 is made of elastic material. The middle of the embedding column 595 is larger than the clip through hole 592. The front and the rear of the embedding column 595 are smaller than or equal to the clip through hole 592. The front end of the embedding column 595 is in the shape of curve or sphere or cone for the convenience of embedding. The second protrusion portion 594 is a handheld position. The screw cover 591 is made of waterproof material, such as soft plastic, plastic cement, etc. A circular nonskid groove is formed at a side surface of the screw through hole in the connection portion 32. A plurality of latches are disposed in the circular nonskid groove. A small clamping groove is formed between adjacent latches. A latch matched with the clamping groove of the circular nonskid groove is disposed in the series connection portion so as to position the main body 2 in a required angle.

The controller 4 also comprises a circuit board 6, an osciducer and a loudspeaker which are positioned between the upper cover 41 and the lower cover 42. The circuit board 6 is respectively connected with the loudspeaker and the osciducer. The function button comprises operation buttons and numeral buttons. The circuit board 6 comprises a microprocessor. The microprocessor generates a password lock according to a pressing order of the numeral buttons.

The loudspeaker used in the bicycle alarm device 1 is a sheet loudspeaker. The circuit board 6 is also provided with an LED lamp. A transparent piece 414 is disposed on the upper cover 41 corresponding to the LED lamp.

The above contents are further detailed descriptions of the present disclosure in combination with specific preferred embodiments. However, the specific implementation of the present disclosure shall not be considered to be only limited to these descriptions. For those ordinary skilled in the art to which the present disclosure belongs, several simple deductions or replacements may be made without departing from the conception of the present disclosure, all of which shall be considered to belong to the protection scope of the present disclosure.

The invention claimed is:

1. A bicycle alarm device, comprising a main body and a connection mechanism connected with a bicycle, wherein the main body comprises a controller; the controller comprises an upper cover and a lower cover connected with the upper cover; a first waterproof rubber ring is positioned between the upper cover and the lower cover; the main body also comprises a battery compartment; one end of the battery compartment is connected with the controller, and the other end is connected with the connection mechanism; the battery compartment comprises a compartment body and a compartment cover; and a second waterproof rubber ring is positioned between the compartment body and the compartment cover, wherein the battery compartment is connected with a screw column and a wire passing hole convex groove protruded at one end of the controller; the lower cover is provided with a connecting protrusion portion; a wire passing hole matched with the wire passing hole convex groove and a screw seat matched with the screw column are disposed in the connecting protrusion portion; the wire passing hole comprises an accommodating hole wall for accommodating the wire passing hole convex groove; and the screw seat comprises an accommodating column for accommodating a column body of the screw column.

2. The bicycle alarm device according to claim 1, wherein a connection groove is formed at one end of the battery compartment connected with the controller; the screw column and the wire passing hole convex groove are disposed at the bottom of the connection groove; the connecting protrusion portion covers the connection groove; and the wire passing hole and the screw seat are disposed in the connecting protrusion portion.

3. The bicycle alarm device according to claim 1, wherein one end of the battery compartment connected with the controller is a curve portion with a curve shape; the connection groove is disposed in the curve portion; and the bottom of the connecting protrusion portion is matched with the curve portion to form a connection curve portion.

4. The bicycle alarm device according to claim 1, wherein an inner side of the upper cover is provided with an upper cover groove; the bottom of the upper cover groove is provided with a button hole; the controller also comprises a button rubber cover; and the button rubber cover is embedded into the groove and covers the edge of the groove.

5. The bicycle alarm device according to claim 1, wherein the lower cover is provided with a loudspeaker placing ring for placing a loudspeaker; a sounding hole is disposed in the loudspeaker placing ring; and an outer side of the sounding hole is provided with a loudspeaker cover.

6. The bicycle alarm device according to claim 5, wherein the outer edge of the loudspeaker placing ring is protruded from the outer side of the lower cover to form a loudspeaker convex loop; the outer edge of the sounding hole is protruded from the outer side of the lower cover to form a sounding hole bulge; the sounding hole bulge is disposed in the loudspeaker convex loop; the loudspeaker cover covers the sounding hole bulge; and the loudspeaker cover is larger than the sounding hole bulge and smaller than the loudspeaker convex loop.

7. The bicycle alarm device according to claim 6, wherein the inner side of the loudspeaker cover is provided with at least two bottom supporting ribs; and the bottom supporting ribs and the sounding hole bulge are hot melted and fixed through ultrasonic waves.

8. The bicycle alarm device according to claim 7, wherein the ends of the bottom supporting ribs are provided with positioning bulges.

9. The bicycle alarm device according to claim 1, wherein the connection mechanism comprises a fixed ring and a connection portion; the fixed ring is provided with a separating port; both ends of the separating port of the fixed ring are respectively connected with a connection portion; the connection portion is provided with a screw through hole; the battery compartment is provided with a protrusion portion; the protrusion portion is provided with a screw through hole; the connection mechanism also comprises a screw and a nut; the nut is disposed in the screw through hole; the screw goes through the screw through hole of the protrusion portion and the screw through holes of two connection portions to match with the nut; the protrusion portion is also provided with a screw cover; the protrusion portion is provided with a clip through hole; the screw cover comprises a first protrusion portion and a second protrusion portion; and the first protrusion portion is clamped with the clip through hole.

10. The bicycle alarm device according to claim 1, wherein the upper cover comprises two parts assembled together.

11. A bicycle alarm device, comprising a main body and a connection mechanism connected with a bicycle, wherein the main body comprises a controller; the controller comprises an upper cover and a lower cover connected with the upper cover; a first waterproof rubber ring is positioned between the tipper cover and the lower cover; the main body also comprises a battery compartment; one end of the battery compartment is connected with the controller, and the other end is connected with the connection mechanism; the battery compartment comprises a compartment body and a compartment cover; and a second waterproof rubber ring is positioned between the compartment body and the compartment cover, wherein the lower cover is provided with a loudspeaker placing ring for placing a loudspeaker, a sounding hole is disposed in the loudspeaker placing ring; and an outer side of the sounding hole is provided with a loudspeaker cover, wherein the outer edge of the loudspeaker placing ring is protruded from the outer side of the lower cover to form a loudspeaker convex loop; the outer edge of the sounding hole is protruded from the outer side of the lower cover to form a sounding hole bulge; the sounding hole bulge is disposed in the loudspeaker convex loop; the loudspeaker cover covers the sounding hole bulge; and the loudspeaker cover is larger than the sounding hole bulge and smaller than the loudspeaker convex loop.

12. The bicycle alarm device according to claim 11, wherein the inner side of the loudspeaker cover is provided with at least two bottom supporting ribs; and the bottom supporting ribs and the sounding hole bulge are hot melted and fixed through ultrasonic waves.

13. The bicycle alarm device according to claim 12, wherein the ends of the bottom supporting ribs are provided with positioning bulges.

14. The bicycle alarm device according to claim 11, wherein the upper cover comprises two parts assembled together.

\* \* \* \* \*